United States Patent [19]

Sridhar et al.

[11] 4,049,438

[45] Sept. 20, 1977

[54] NON-FERROUS METAL RECOVERY FROM DEEP SEA NODULES

[75] Inventors: Ramamrithan Sridhar, Mississauga; John Stuart Warner, Oakville; Malcolm Charles Evert Bell, Sudbury, all of Canada

[73] Assignee: The International Nickel Company, Inc., Del.

[21] Appl. No.: 549,978

[22] Filed: Feb. 14, 1975

[30] Foreign Application Priority Data

Mar. 11, 1974 Canada ............................ 194558/74
Aug. 2, 1974 Canada ............................ 206227/74

[51] Int. Cl.² .............................................. C21B 1/00
[52] U.S. Cl. ............................................ 75/21; 75/74; 75/80; 75/82; 75/84; 75/101 R; 423/48; 423/49; 423/53; 423/138; 423/561 R; 423/417
[58] Field of Search ............. 75/21, 80, 82, 74, 101 R; 423/48, 49, 53, 138, 561, 48, 49, 417

[56] References Cited

U.S. PATENT DOCUMENTS

| 1,927,240 | 9/1933 | Lofquist | 75/80 |
|---|---|---|---|
| 3,030,201 | 4/1962 | Queneau et al. | 75/82 |
| 3,751,554 | 8/1973 | Bare et al. | 423/32 |

FOREIGN PATENT DOCUMENTS

| 871,066 | 5/1971 | Canada | 75/80 |
|---|---|---|---|
| 1,211,053 | 11/1970 | United Kingdom | 75/80 |
| 779,031 | 7/1957 | United Kingdom | 75/80 |

OTHER PUBLICATIONS

Beck et al., Proceedings of AIME Copper Metallurgy pp. 70-82, 1970.
Nagaya et al., 79 Chem. Abstracts 128254; 1973.

*Primary Examiner*—M. J. Andrews
*Attorney, Agent, or Firm*—Miriam W. Leff; Ewan C. MacQueen

[57] ABSTRACT

Manganiferous deep sea nodules containing non-ferrous metal values are selectively reduced to reduce manganic oxides to manganous oxide (MnO) and the non-ferrous metal values to the metallic state, and the selectively reduced nodules are then smelted to produce a molten metallic alloy containing the non-ferrous metal values and a slag containing most of the manganese. The molten alloy is blown with a free-oxygen-containing gas to eliminate most of the manganese, and the substantially manganese-free metal is then sulfided to produce a matte suitable for separation and recovery of the non-ferrous metal values. After sulfiding the matte can be blown with a free-oxygen-containing gas to lower the iron content thereof. Not all the iron is removed if it is advantageous to keep a high proportion of cobalt in the matte.

31 Claims, No Drawings

NON-FERROUS METAL RECOVERY FROM DEEP SEA NODULES

The present invention relates to the recovery of non-ferrous metal values from manganiferous oxide materials, and more particularly to a pyrometallurgical process for recovering non-ferrous metal values associated with sea nodules.

As the prospects of ocean mining have been improving, more and more attention has been focused on the recovery of metal values from sea nodules. Both pyrometallurgical and hydrometallurgical processes have been proposed for recovering non-ferrous metal values as well as manganese from the nodules. However, the low value of manganese and iron, the major metals in the nodules and the low concentration of the other more valuable non-ferrous metal values place stringent economic constraints on any process.

It has been suggested to treat sea nodules by reduction smelting techniques to recover the non-ferrous metal values. For examole, nodules, after an optional drying treatment, are mixed with a reductant and the mixture is fed to an electric furnace to smelt and reduce the non-ferrous metal values associated with the nodules to a metal phase and to retain the manganese in the slag. The metal phase is separated from the slag and then treated to recover separately the non-ferrous metal values. Although this process insures good recoveries of the non-ferrous metal values, the process has certain operational and economical disadvantages — large quantities of gas are evolved in the smelting furnace causing slag foaming and possible electric arc instability and undesirably high fuel consumption.

It has now been discovered that the non-ferrous metal values associated with manganese deep sea nodules can be substantially completely recovered by a combination of pyrometallurgical operations. It has also been discovered that the resulting metallic alloy can be further treated by an advantageous embodiment to produce a sulfide phase from which most of the non-ferrous metal values can be separately recovered.

Generally speaking, the present invention involves a process for pyrometallurgically treating manganiferous oxide materials, particularly manganiferous deep sea nodules, containing iron and at least one non-ferrous metal value selected from the group consisting of nickel, cobalt, copper or molybdenum to recover the non-ferrous metal value. The manganiferous oxide material is reduced and smelted to produce a molten alloy containing a preponderant part of the non-ferrous metal value initially contained in the manganiferous oxide material. The molten alloy is separated from the slag and blown with a free-oxygen-containing gas to oxidize and slag a large proportion of the manganese contained in the metal to lower the manganese content thereof, advantageously to a value as low as practical bearing in view the physical and chemical factors involved. Generally the manganese content is lowered to less than about 0.7%, preferably to 0.3% or even 0.1% after which the molten metal is at least partially sulfided to produce a matte so as to facilitate separation and recovery of the non-ferrous metal value.

All manganiferous oxide materials containing iron and at least one non-ferrous metal value selected from the group consisting of nickel, cobalt, copper and molybdenum can be treated by the process in accordance with the present invention. However, for the sake of brevity, the present invention will be described in conjunction with the treatment of manganiferous deep sea nodules. The composition of deep sea nodules can vary over wide ranges; and for purposes of the present invention, the exact composition of the nodules is not vital as long as the total non-ferrous metal value content is sufficiently high to warrant its economical recovery. For illustrative purposes, typical deep sea nodules contain between about 0.5% and 2.2% nickel, between about 0.1% and 1.5% cobalt, between about 0.3% and 2% copper, between about 0.01% and 0.1% molybdenum, between about 4% and 17% iron, between about 12% and 34% manganese and the balance essentially volatile matter, including water, and silica with minor amounts of calcium oxide, magnesia and alumina. It should be noted that all solid and liquid compositions given herein are on a weight basis unless otherwise noted and that gaseous compositions are given on a volumetric basis.

As the term "manganiferous deep sea nodule" or just "deep sea nodule" implies, these manganiferous materials occur in nodules of ellipsoidal form. The nodules range in size from less than a centimeter to 10 centimeters or more. Nodules are nucleated on calcareous or siliceous material and grow in size as a brownish-black manganese deposit on the nucleus. The concretionary form of these nodules provides a porous structure so that little or no crushing or grinding is required and the solid state reduction required for this process, advantageously selective reduction, can readily proceed without any pretreatment. If desired, the nodules can be crushed or ground to a suitable fineness to promote further reduction or to facilitate the use of particular apparatus such as fluid bed reactors. It is advantageous, however, to conduct the intial reduction treatment without any prior crushing or grinding so that the reduction operation, particularly when fuel-fired furnaces are employed, can be conducted with only minimal dusting problems.

Although the process in accordance with the present invention can be conducted without resort to selective reduction, it is advantageous for numerous reasons, including fuel consumption and melting vessel capacity, to selectively reduce the manganiferous nodules. The nodules are fed to a furnace and heated to a temperature of at least about 750° C. less than about 1100° C. in an atmosphere reducing to the non-ferrous metal values but substantially not to manganous oxide to reduce most of the non-ferrous metal oxides to the metallic state while reducing manganic oxide to manganous oxide and only minor amounts of manganous oxide to manganese metal. Advantageously, reduction is conducted at temperatures between about 800° C. and 1000° C. to provide high reduction kinetics while minimizing problems associated with sticking and the like. The reductants in the reducing zone are provided either by mixing a reductant with the feed or by injecting solid or liquid fuels into the hot ore bed and/or by combustion of fuel with sub-stoichiometric amounts of air. The heat in the reducing zone is provided by the combustion of fuel and the heat and reductant requirements are balanced to determine the percent aeration used in combusting the fuel and the amount of solid or liquid reductant provided for the selective reduction. The reductant supplied should be between 1.2 and 2.5 times the stoichiometric requirements. Prereduction before smelting is particularly advantageous when smelting is done in an electric arc furnace because prereduction lowers (1)

electric furnace power requirements, (2) solid reductant requirements because selective reduction is carried out by gaseous reductants produced by partial combustion of fuel and (3) gas evolution in the electric furnace which gives better furnace operation and minimizes pollution control problems. The foregoing benefits are realized when substantially all the manganic oxides are reduced to manganous oxide (MnO) and a preponderant part of the non-ferrous metal values to the metallic state i.e., at least about 70% of nickel and copper and 60% of cobalt values in the nodules are reduced to the metallic state.

The type of furnace in which the selective reduction is effected is not critical but should be of such a design that gas-solid contact is promoted. Thus, rotary kiln furnaces, which provide a gently tumbling bed of nodules with constantly changing surfaces, or rotary hearth furnaces, in which a shallow bed insures good gas-solid contact, are advantageously employed. Alternatively, a shaft type furnace, employing raw nodules and reductant or nodules briquetted with reductant can be employed to insure the requisite gas-solid contact. When rotary hearth furnaces are employed for reduction the reductant can be incorporated in the feed material and the feed material can then be briquetted to insure intimate contact between the feed material and the reductant. Whatever type of reduction furnace is used, provisions should be made to convey the selectively reduced nodules to the smelting furnace with minimal heat losses and reoxidation of reduced metal values in order to maximize fuel or energy efficiency in the smelting process.

As noted before, the prereduced manganese nodules are fed, most advantageously hot, directly to the smelting furnace. Either direct-fired reverberatory type or electric arc furnaces can be employed. From the standpoints of economy of capital costs and energy availability as well as operational control, electric arc furnaces are advantageously employed. A particularly advantageous feature of electric arc furnaces is that air pollution problems are minimized as only minor amounts of gases are generated.

The major objective of the smelting operation is to melt the reduced non-ferrous metal values and to slag the unreduced manganous oxide and other gangue constituents to effect a separation of the metal phase from the slag phase; however, minor amounts of reduction of any unreduced non-ferrous metal values can occur during smelting. Even though a preponderant part of the non-ferrous metal values have been prereduced, it is advantageous to charge small amounts of reductant, e.g., between about 1% and 2%, based on the weight of the reduced ore, along with the reduced ore to minimize reoxidation and to complete reduction of the non-ferrous metal values. Reductants that can be added include coke, coal and wood chips. Alternatively, if smelting is conducted in a fuelfired reverberatory furnace, combustion of the fuel can be controlled to provide an atmosphere nonoxidizing to the reduced metal values.

During smelting slag-forming constituents can be fed to the smelting furnace to flux any unreduced iron and manganous oxide. In many instances, the sea nodules, after selective reduction, are self-fluxing but additional fluxes, like silica, limestone, and dolomite, can be added to provide the desired composition, viscosity, and melting point in the smelting furnace. The slags formed during smelting have low melting points and are fluid at the smelting temperatures employed in the process of the present invention, e.g., between about 1250° C. and 1600° C. Higher metal recoveries are realized with the fluid slags thus produced because metal entrainment in the slag is minimized.

The smelting step produces a molten metal bath of the non-ferrous metal that contains at least about 50% iron and less than about 5% manganese and a slag containing most of the manganese. After separation the metal bath can be processed for separate recovery of the non-ferrous metal values contained therein, and the slag can, if economically feasible, be treated for manganese recovery. The slag can be granulated or cast in molds. If the recovery of manganese is not economically attractive, the slag can be discarded or stockpiled for manganese recovery at a later date. Because of the inert nature of the slag, discarding of the slag will not cause environmental problems which many of the total hydrometallurgical routes have to face.

The manganese can be recovered from the slag by reduction smelting in an electric furnace at a temperature in excess of 1350° C., and preferably at 1500° to 1700° C. with the addition of flux, e.g., limestone, dolomite and reductant, e.g., coal, coke, ferrosilicon and silicomanganese. Additional manganese ore can be blended with the slag to provide the required grade of ferromanganese product. The carbon content of the manganese product can be minimized by the use of low carbon reductant such as low carbon ferrosilicon or silicomanganese.

In terms of conserving energy, it is beneficial to treat the molten manganese-containing slag instead of cooling the slag and reheating it for manganese recovery. This can be carried out by transferring the molten slag to a second electric furnace where the required flux, reductants and manganese ore, if required, are added as stated above.

It should be pointed out that when manganese recovery is required or the slag is to be utilized for conventional ferromanganese production it is advantageous to obtain maximum non-ferrous metal recovery in the molten alloy to provide a manganese bearing slag with a minimum of non-ferrous metal value. This insures a high purity of the manganese product produced from the slag. It has been possible to achieve this goal by insuring the reduction of up to about 3% manganese in the non-ferrous metal alloy.

The metal bath containing the non-ferrous metal values, at least about 50% iron and less than about 5% manganese is advantageously transferred to a converter as the first stage of the separation and recovery process. In the converter the molten metal bath is blown with a gas containing free oxygen to lower preferentially the manganese content of the bath to facilitate subsequent sulfiding of the molten metal bath. Blowing with oxygen-containing gas is continued to lower the manganese content of the bath to a low practical value, e.g., less than about 0.7%. Elimination of manganese from the molten bath is advantageous in that the efficiency of the subsequent sulfiding operation is improved because manganese is a strong sulfide former which increases the amount of sulfur or sulfur-bearing material that is consumed in the sulfiding operation. Thus, manganese in the metal will form a manganese sulfide mush when sulfur is added to the metal bath.

Sulfidation is effected by contacting the molten metal bath with at least one sulfur-bearing material selected from the group consisting of elemental sulfur, pyrite and pyrrhotite under an atmosphere that is non-oxidizing to the constituents in the bath or to the formed sulfides. Advantageously, sulfiding is conducted at temperatures between about 1250° C. and 1600° C. and in such a manner that good physical contact between the sulfur-bearing material and the molten bath is insured. The amount of sulfur incorporated in the bath will depend upon the bath composition and upon the proposed method of treating the sulfided metal for separation and recovery as will be described hereinafter. After sulfiding the bath is again blown with a free-oxygen-containing gas to oxidize and slag the iron with suitable fluxes. The second stage blowing is terminated before the iron content falls to below about 5%. The reason for terminating the blowing operation before the iron content falls below about 5% is to minimize cobalt losses. If blowing is continued after the iron content falls below about 5%, cobalt, in significant amounts, is oxidized and fluxed by the slag thereby lowering cobalt recoveries for the overall process. The finishing slag from the iron removal step is recycled to the reduction of smelting step to enhance overall recovery of metal and particularly that of cobalt. If cobalt recovery is not important, blowing can be continued until the iron content is lowered to between about 0.2% and 1%.

Manganese elimination, sulfiding and converting to remove iron can be conducted in conventional metallurgical furnaces, and the steps can be conducted sequentially in the same furnace or as a batch process using two furnaces. From the standpoints of thermal and chemical efficiency, process control and mechanical simplicity, top blown rotary converters, equipped with fuel-burning lances for atmosphere and temperature control, are advantageously used for manganese elimination and sulfiding, and for converting to remove iron.

The amount of sulfur incorporated in the bath is selected to facilitate subsequent separation and recovery of the non-ferrous metal values. For example, sufficient sulfur is added to provide about 20% to 26% sulfur in the matte after converting iron to less than 1%, e.g., less than 0.8% in the final matte. This matte can then be slow cooled to allow the copper and nickel values to crystallize separately and for the separately crystallized phases to grow by diffusion. The thuscooled matte can then be comminuted and the nickel and copper sulfide phases separated by magnetic and/or flotation techniques. The separated nickle and copper sulfide phases can be treated by conventional techniques for recovery and further refining.

As another embodiment, sulfur is incorporated in the molten bath in amounts sufficient to tie up the copper, cobalt and iron as $Cu_2S$, $CoS$ and $FeS$ and the resulting bath is then granulated in water. The granules containing sufficient sulfur to bind copper, cobalt, and iron as sulfides are then treated with carbon monoxide at moderate superatmospheric pressures (e.g., between 5 atmospheres and 100 atmospheres) to recover the nickel as nickel carbonyl. The carbonylation residue can be hydrometallurgically treated to separately recover the other non-ferrous metal values remaining in the residue.

Alternatively, sufficient amounts of sulfur are added to the metallic alloy after manganese elimination to insure that the matte produced after required iron removal contains sufficient sulfur to insure dissolution of substantially all of the nickel, copper and cobalt during subsequent oxidation leaching. Advantageously, when oxidation leaching is to be employed, sufficient sulfur is incorporated in the matte to provide for the dissolution any remaining of iron and to generate sufficient amounts of acid to lower the pH value of the leaching solution during oxidation leaching to between about 1 and 3 to insure that the kinetics of the leaching process are commercially attractive. In most instances, sulfur addition to provide the unconverted matte with sulfur contents between about 2% and 10% are employed. After iron removal, the matte will contain sufficient sulfur to sulfidize the remaining values.

In order to give those skilled in the art a better understanding of the present invention the following illustrative example is given:

EXAMPLE I

Pacific Ocean sea nodules containing 1.14% nickel, 0.78% copper, 0.19% cobalt, 5.9% iron, 21.75% manganese, 22.6% silica, 3.16% maganesium, and 1.89% calcium, all on a dry basis, were dried and selectively reduced at 1000° C. with 8.12% coke to reduce at least 80% of the non-ferrous metal values to the metallic state and substantially all of the manganese dioxide to manganous oxide (MnO). The selectively reduced nodules were smelted at 1425° C. in a furnace yielding a metal phase about 8% of the dry nodule weight analyzing 14.5% nickel, 9.3% copper, 2.3% cobalt, 70.2% iron, 2.5% manganese, and 0.74% carbon and a slag phase about 70% of the dry nodule weight analyzing 0.045% nickel, 0.058% copper, 0.009% cobalt, 0.88% iron, 27.2% manganese and 37.5% silica. Recoveries, based on the amounts in the dry nodules, of the metal values in the metal phase were 97.8% for the nickle, 94.5% for the copper, 96.5% for the cobalt, 88.5% for the iron, and only 1% for the manganese.

The molten metal alloy was blown with a free-oxygen-containing gas to lower the manganese content to less than 0.1%. During the blowing operation when the iron content was lowered to about 50% the manganese content was less than 0.01%. The molten metal phase was then sulfided by the addition of 3% sulfur to provide a sulfur content of 2.6%. The sulfided metal phase was blown with a free-oxygen containing gas to lower the iron content to about 5%. Termination of the blowing operation when the iron content had reached 5% minimized cobalt losses to the slag to less than about 25%. After blowing to remove iron the sulfided metal bath was then granulated for subsequent non-ferrous metal value recoveries.

EXAMPLE II

In this example a molten alloy from reduction smelting of sea nodules analyzing 14% nickel, 9.1% copper, 2.1% cobalt, 67.8% iron and 5.4% manganese was sulfided at 1400° C. by adding sulfur corresponding to 8% by weight of the alloy. After sulfiding, the alloy contained only 2.1% sulfur and 0.23% manganese. Most of the sulfur was consumed in forming manganese sulfide mush rather than dissolving in the alloy as desired. Accordingly, best sulfiding efficiency is obtained when most of the manganese is eliminated by oxidation before sulfur addition.

EXAMPLE III

In this example sea nodules of the same composition as in Example I were reduced in a rotary kiln at 1000° C. under a reducing gas simulating combustion of Bunker C oil at 60% aeration. During reduction, 91.9% of the copper, 88.5% of the nickel and 72% of the cobalt were reduced to the metallic state. X-ray diffraction analysis identified all the manganese to be either as manganous oxide or manganous silicate indicating complete reduction of the manganic oxides in the sea nodules to the MnO state.

Subsequent smelting of the reduced product with coal added to mainly provide the reducing atmosphere on top of the slag, yielded a metal analyzing 21.0% nickel, 11.7% copper, 2.1% cobalt, 67.4% iron and 1.85% manganese. The slag analyzed 0.055% nickel, 0.032% copper, 0.003% cobalt, 1% iron and 22.3% manganese. The metal phase amounted to 7.8% of nodule weight and contained 96.9% of the nickel, 96.7% of the copper, 98.1% of the cobalt, 84.5% of the iron and only 0.67% of the manganese.

The above alloy was treated as in Example I to obtain a sulfide product suitable for hydrometallurgical treatment.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for recovering at least one non-ferrous metal value selected from the group consisting of nickel, cobalt, copper or molybdenum, which non-ferrous metal value is present as an oxide, from a manganiferous oxide material which process comprises selectively reducing said non-ferrous metal values and then smelting the manganiferous oxide material to produce a first molten alloy containing a preponderant part of the non-ferrous metal values and a first manganese-containing slag, separating the first molten alloy from the first manganese-containing slag, blowing the separated molten first alloy with a free-oxygen-containing gas to oxidize and slag most of the manganese contained in the first molten alloy and to form a second molten alloy further depleted in manganese and a second manganese-containing slag, separating the second molten alloy from the second manganese-containing slag, and then sulfiding the second molten alloy to facilitate separation and recovery of the non-ferrous metal values.

2. The process as described in claim 1 wherein the manganiferous oxide material is heated to a temperature of at least about 750° C. but below about 1100° C. in an atmosphere reducing to oxides of the non-ferrous metal values but substantially not to manganous oxide to reduce a preponderant part of the non-ferrous metal value to the metallic state and a preponderant part of the manganese to manganous oxide and only minor amounts to the metallic manganese state.

3. The process as described in claim 2 wherein the manganiferous oxide material is reduced at temperatures between about 800° C. and 1000° C.

4. The process as described in claim 2 wherein at least about 70% of any nickel and copper and at least bout 60% of any cobalt contained in the manganiferous oxide is reduced to the metallic state.

5. The process as described in claim 2 wherein smelting is conducted at a temperature between about 1250° C. and 1600° C.

6. The process as described in claim 2 wherein the first molten alloy contains at least about 50% iron and less than about 5% manganese.

7. The process as described in claim 2 wherein at least one of the slags containing manganese is treated with at least one reducing agent selected from the group consisting of coal, coke, ferrosilicon, or silicomanganese at a temperature in excess of about 1350° C. to reduce the manganese value in the slag and to form a molten manganese metal bath.

8. The process according to claim 7 wherein said manganese-containing slag is treated without soidification at a temperature of about 1500° to 1700° C.

9. The process as described in claim 2 wherein the molten alloy is blown to reduce the manganese content thereof below about 0.7% sulfided by addition thereto of at least one sulfur-bearing material selected from the group consisting of elemental sulfur, pyrites, or pyrrhotite.

10. The process as described in claim 1 wherein the manganiferous oxide material is sea nodules.

11. A process for recovering at least one non-ferrous metal value selected from the group consisting of nickel, cobalt, copper or molybdenum, which non-ferrous metal value is present as an oxide, from a manganiferous oxide material which process comprises selectively reducing said non-ferrous metal values at a temperature of at least about 750° C but below about 1100° C in an atmosphere reducing to oxides of the non-ferrous metal values but substantially nonreducing to manganous oxide to reduce a preponderant part of the non-ferrous metal values to the metallic state and a preponderant part of the manganese to manganous oxide and only minor amounts to the metallic manganese state, smelting the selectively reduced manganiferous oxide material to produce a first molten alloy containing a preponderant part of the non-ferrous metal values and a first manganese-containing slag, separating the first molten alloy from the first manganese-containing slag, blowing the separated first molten alloy with a free-oxygen-containing gas to oxidize and slag most of the manganese contained in the first molten alloy and to form a second molten alloy further depleted in manganese and a second manganese-containing slag, separating the second molten alloy from the second manganese-containing slag, sulfiding the second molten alloy to produce a matte, and then blowing the matte said matte containing iron values in the molten condition with a free-oxygen-containing gas to slag iron.

12. The process as described in claim 11 wherein iron slagging is continued until the iron content of the molten matte is lowered to between about 0.2% and 1%.

13. The process according to as described in claim 11 wherein the matte after iron removal contains nickel, copper, less than 1% iron, and about 20% to 26% sulfur and the matte is slowly cooled to provide separately crystallized nickel and copper phases.

14. The process as described in claim 11 wherein the matte contains, after iron removal, sufficient sulfur to tie up copper, cobalt and iron as $Cu_2S$, CoS and FeS, the matte is granulated and the resulting granules are carbonylated to recover nickel as nickel carbonyl.

15. The process according to as described in claim 11 wherein the matte contains, after iron removal, sufficient sulfur that, upon oxidation leaching a solution pH less than 3 is generated, and the matte is subjected to oxidation leaching to recover metal values in solution.

16. The process as described in claim 11 wherein iron slagging is terminated before the iron content of the molten matte falls below 5% to minimize cobalt losses.

17. A process for recovering from sea nodules at least one non-ferrous metal selected from the group consisting of nickel, cobalt, copper and molybdenum, said sea nodules being an oxidic material containing a major amount of manganese and iron and at least one of said non-ferrous metal values; comprising selectively reducing the sea nodules at a temperature of at least about 750° C to below about 1100° C in an atmosphere reducing to oxides of non-ferrous metal values but substantially not reducing to manganous oxide to reduce a preponderant part of the non-ferrous metal values to the metallic state and a preponderant part of the manganese values having an oxidation state greater than plus 2 to manganous oxide, smelting the selectively reduced material at a temperature of from about 1250° to about 1600° C to form a first molten alloy containing a preponderant part of the non-ferrous metal values and a first manganese-containing slag, separating the first molten alloy from the first manganese-containing slag, blowing the separated first molten alloy with a free-oxygen-containing gas to oxidize manganese in the molten alloy and produce a second molten alloy and a second manganese-containing slag, separating said second manganese-containing slag from the second molten alloy to produce a second molten non-ferrous metal-containing alloy further depleted in manganese.

18. The process as described in claim 17 wherein the sea nodules are reduce at temperatures between about 800° C and 1000° C.

19. The process as described in claim 17 wherein at least about 70% of any nickel and copper and at least about 60% of any cobalt contained in the sea nodules are reduced to the metallic state.

20. The process as described in claim 17 wherein the first molten alloy contains at least about 50% iron and less than about 5% manganese.

21. The process as described in claim 17 wherein at least one of the slags containing manganese is treated with at least one reducing agent selected from the group consisting of coal, coke, ferrosilicon, or silicomanganese at a temperature in excess of about 1350° C to reduce the manganese value in the slag and to form a molten manganese metal bath.

22. The process according to claim 21 wherein said manganese-containing slag is treated without solidification at a temperature of about 1500° to 1700° C.

23. The process as described in claim 17 wherein the first molten alloy is blown to reduce the manganese content thereof below about 0.7%, and the second molten alloy is sulfided by addition thereto of at least one sulfur-bearing material selected from the group consisting of elemental sulfur, pyrites, or pyrrhotite.

24. A process for recovering from sea nodules at least one non-ferrous metal selected from the group consisting of nickel, cobalt, copper and molybdenum, said sea nodules being an oxidic material containing a major amount of manganese and iron and at least one of said non-ferrous metal values; comprising selectively reducing the sea nodules at a temperature of at least about 750° C to below about 1100° C in an atmosphere reducing to oxides of non-ferrous metal values but substantially non-reducing to manganous oxide to reduce a preponderant part of the non-ferrous metal values to the metallic state and a preponderant part of the manganese values to manganous oxide, smelting the selectively reduced material at a temperature of from about 1250° to about 1600° C to form a first molten alloy containing a preponderant part of the non-ferrous metal values and a first manganese-containing slag, separating the first molten alloy from the first manganese-containing slag, blowing the separated first molten alloy with a free-oxygen-containing gas to oxidize and slag manganese contained in the first molten alloy and to form a second molten alloy further depleted in manganese and a second manganese-containing slag separating said second manganese-containing slag from the second molten alloy, sulfiding said second molten alloy to produce a matte, said matte containing iron values, and blowing the matte in the molten condition with a free-oxygen-containing gas to slag iron.

25. The process as described in claim 24 wherein iron slagging is terminated before the iron content of the molten matte falls below 5% to minimize cobalt losses.

26. The process as described in claim 24 wherein iron slagging is continued until the iron content of the molten matte is lowered to between about 0.2% and 1%.

27. The process as described in claim 24 wherein cobalt values are present in the matte and wherein said iron slagging is terminated before the iron content of the molten matte falls below 5% to minimize cobalt losses.

28. The process as described in claim 24 wherein said iron slagging is continued until the iron content of the molten matte is lowered to between about 0.2% and 1%.

29. A process for recovering at least one non-ferrous metal value selected from the group consisting of nickel, cobalt, copper or molybdenum, which non-ferrous metal value is present as an oxide, from a manganiferous oxide material which process comprises selectively reducing and smelting the manganiferous oxide material to produce a first molten alloy containing a preponderant part of the non-ferrous metal values and a first manganese-containing slag, separating the first molten alloy from the first manganese-containing slag, blowing the separated first molten alloy with a free-oxygen-containing gas to oxidize and slag most of the manganese contained in the first molten alloy to form a second molten non-ferrous metal-containing alloy and a second manganese-containing slag, separating the second molten alloy from the second manganese-containing slag, and then sulfiding the second molten alloy to facilitate separation and recovery of the non-ferrous metal values.

30. A process for recovering from sea nodules at least one non-ferrous metal selected from the group consisting of nickel, cobalt, copper and molybdenum, said sea nodules being an oxidic material containing a major amount of manganese and iron and at least one of said non-ferrous metal values comprising treating the sea nodules at a temperature of at least about 750° C to below about 1100° C to reduce selectively a preponderant part of the non-ferrous metal values to the metallic state and only minor amounts of manganese values to the metallic state, smelting the selectively reduced material at a temperature of from about 1250° to about 1600° C to form a first molten alloy containing a preponderant part of the non-ferrous metal values and a first manganese-containing slag, separating and removing the first molten alloy from the first manganese-containing slag, blowing the separated first molten alloy with a free-oxygen-containing gas to oxidize and slag manganese contained in the first molten alloy and to form a second molten alloy further depleted in manganese and a second manganese-containing slag, separating and removing the second manganese-containing slag from the second molten alloy sulfiding said second molten alloy to produce a matte, said matte containing iron values, and blowing the matte in the molten condition with a free-oxygen-containing gas to slag iron.

31. A process for recovering at least one non-ferrous metal value selected from the group consisting of nickel, cobalt, copper or molybdenum, which non-ferrous metal value is present as an oxide, from a manganiferous oxide material which process comprises treating said manganiferous oxide material at a temperature of at least about 750° C but below about 1100° C to reduce selectively a preponderant part of the non-ferrous metal values to the metallic state and only minor amounts of manganese values to the metallic manganese state, smelting the selectively reduced manganiferous oxide material to produce a first molten alloy containing a preponderant part of the non-ferrous metal values and a first manganese-containing slag, separating and removing the first molten alloy from the fist manganese-containing slag, blowing the separated first molten alloy with a free-oxygen-containing gas to oxidize and slag manganese contained in the first molten alloy and to form a second molten alloy further depleted in manganese and a second manganese-containing slag, separating and removing second maganese-containing slag from the second molten alloy, sulfiding the second molten alloy to produce a matte, said matte containing iron values, and then blowing the matte in the molten condition with a free-oxygen-containing gas to slag iron.

* * * * *